(12) United States Patent
Kearney et al.

(10) Patent No.: US 7,899,311 B1
(45) Date of Patent: Mar. 1, 2011

(54) REMOVABLE SHUTTER FOR A CAMERA

(75) Inventors: Kevin J. Kearney, Fairport, NY (US);
Peter Hammond, Rochester, NY (US);
Philip Frank Marino, Rochester, NY (US)

(73) Assignee: Optech International, Inc., West Henrietta, NY (US)

( * ) Notice: Subject to any disclaimer, the term of this patent is extended or adjusted under 35 U.S.C. 154(b) by 121 days.

(21) Appl. No.: 12/432,458

(22) Filed: Apr. 29, 2009

Related U.S. Application Data

(60) Provisional application No. 61/125,867, filed on Apr. 29, 2008.

(51) Int. Cl.
*G03B 9/08* (2006.01)

(52) U.S. Cl. .......................................... 396/12; 396/419

(58) Field of Classification Search ............ 396/7, 396/12, 144, 360–372, 419, 462, 551, 452; 348/144
See application file for complete search history.

(56) References Cited

U.S. PATENT DOCUMENTS

| 2,198,920 | A | * | 4/1940 | Robinson | 396/13 |
| 2,393,851 | A | * | 1/1946 | Wills et al. | 248/179.1 |
| 2,685,238 | A | * | 8/1954 | Baker | 396/12 |
| 3,500,733 | A | * | 3/1970 | Kreuz et al. | 396/7 |
| 4,770,497 | A | * | 9/1988 | Brown | 359/896 |
| 5,004,205 | A | * | 4/1991 | Brown et al. | 248/476 |
| 7,127,348 | B2 | | 10/2006 | Smitherman et al. | |
| 7,334,950 | B2 | | 2/2008 | Viglione et al. | |
| 2004/0252992 | A1 | * | 12/2004 | Hunter | 396/535 |
| 2006/0016061 | A1 | * | 1/2006 | Shelef | 29/464 |

OTHER PUBLICATIONS

Reif et al ("BUSCA's first Calar Alto campaigns", dated Feb. 2001, retrieved from <http://www.astro.uni-bonn.de/~ccd/busca/ca_newsletter/>).*

* cited by examiner

*Primary Examiner*—Christopher E Mahoney
*Assistant Examiner*—Leon W Rhodes
(74) *Attorney, Agent, or Firm*—Simpson & Simpson, PLLC

(57) ABSTRACT

The present invention is a camera system having a rigid camera frame to receive a removable shutter and serve as a releasable attachment point for the camera lens system and image receiving means. An adaptor and wedge have complementary contact points that allow constant alignment and orientation of the system components after removal and reattachment without recalibration or realignment. The camera system may be used in a photographic imaging system such as an airborne reconnaissance system.

30 Claims, 9 Drawing Sheets

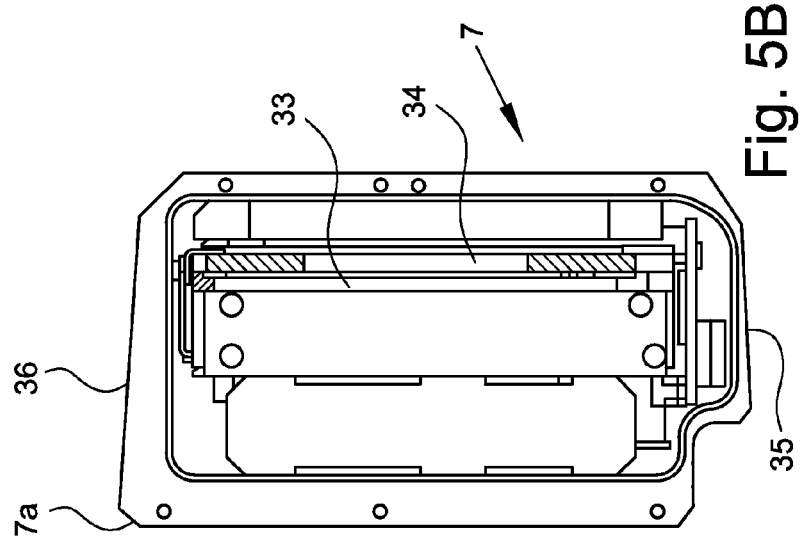
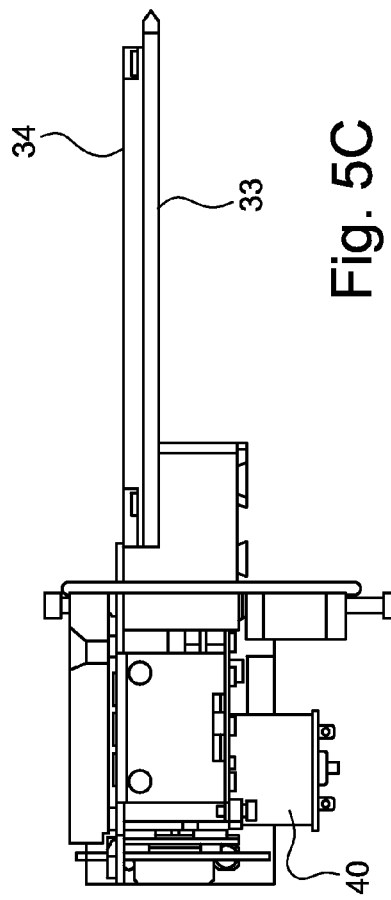
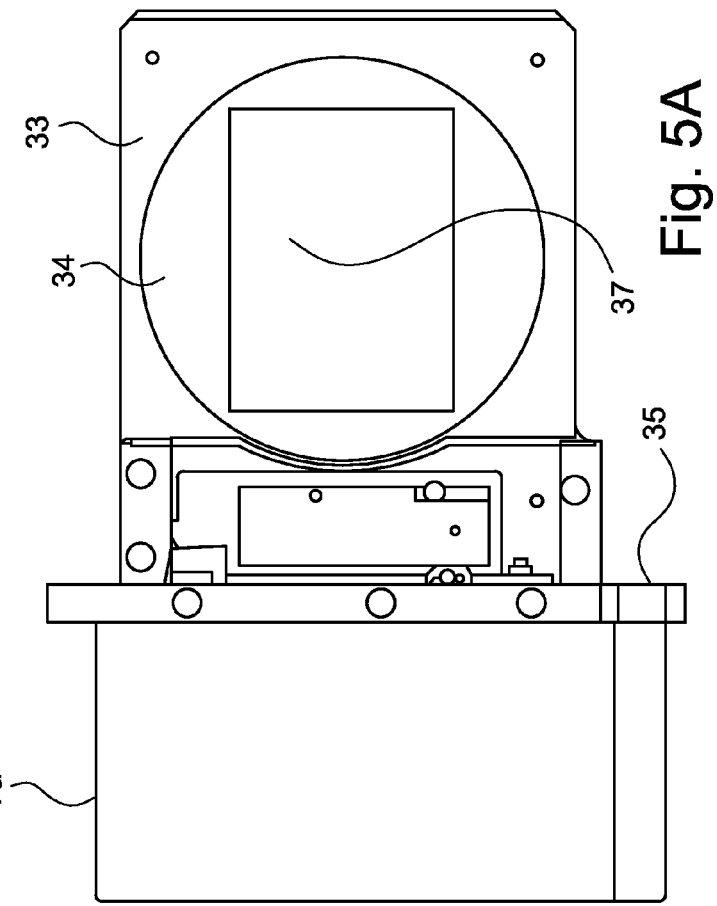

REMOVABLE SHUTTER FOR A CAMERA

CROSS-REFERENCE TO RELATED APPLICATIONS

The present application claims benefit under 35 U.S.C. §119(e) of U.S. Provisional Patent Application Ser. No. 61/125,867 filed Apr. 29, 2008.

FIELD OF THE INVENTION

The present invention pertains to components for a camera, including a camera shutter, specifically a replaceable camera shutter and other components assembled so as to reduce or eliminate the need for repeated recalibration or realignment when camera components are removed and replaced.

BACKGROUND OF THE INVENTION

The use of airborne camera systems is known in the art. Such systems are used for aerial mapping, monitoring of natural resources, reconnaissance, and other activities. Although some of these systems are used in orbiting satellites, they are also used in airplanes that are especially equipped with stable rack arrangements to hold the cameras to obtain images that are as clear and detailed as possible.

One problem that exists with such camera systems is system downtime. It is costly and time consuming to be prevented from operating an airborne system because one component malfunctions. This is especially true if a malfunction occurs while the system is in the air. Not only is the planned activity curtailed, but the operating and personnel costs are increased due to the necessity to repeat the curtailed operation(s). Moreover, equipment repair often necessitates disassembly, shipment to the OEM (original equipment manufacturer) for repair, and recalibration once a new or repaired component is finally made available to the system operator.

One especially vulnerable component is the camera shutter used in aerial photography systems. While some camera components, such as lenses and the image data receiver are usually inactive, the camera shutter opens and closes repeatedly to expose the image receiver to incoming light. In some contemporary systems, fifty or one hundred thousand exposures can be made over the course of a twelve month period, often in extremely rapid succession. Shutters comprise several mechanical elements such as the motors and bearings that move the shutter over the aperture. Because these elements are subjected to rapid and repeated movement, they tend to wear down over time leading to shutter failure. Such failure often occurs in mid-operation as there is ordinarily no method of determining beforehand when shutter components are about to fail. This leads not only to a waste of time and resources caused by prematurely discontinuing an operation, but also extends downtime originating from removing the camera, shipping it to the OEM or a repair center, shipping the repaired camera back, and calibrating the camera to the whole system.

What is needed then is a shutter apparatus constructed so as to be easily replaceable during operation without the necessity of prematurely discontinuing the current operation and extended downtime while a shutter or camera is shipped offsite for repair and recalibrated to coordinate with an entire system.

SUMMARY OF THE INVENTION

The present invention broadly comprises a camera system having a removable shutter, the camera system comprising: a camera frame having at least one open side and defining at least two opposing camera frame orifices; an image receiving means releasably attached to the camera frame and positioned at least partly over the first of the two opposing camera frame orifices; an adaptor defining an adaptor orifice positioned around the second of the two opposing camera frame orifices and having three kinematic adaptor contact points, each of the three adaptor contact points having a different shape; at least one lens system, each of the at least one lens system having at least one lens, wherein each of the at least one lens system includes an attachment end having at least three attachment points for releasable attachment to the camera frame and positioned to at least partly cover the second opposing camera frame orifice; at least one wedge, each of the at least one wedge defining a wedge orifice and including three kinematic wedge contact points, each of the three kinematic wedge contact points having a shape complementary to an opposing kinematic adaptor contact point; and, a removable shutter cassette including a camera shutter and a light seal, wherein the removable cassette is received by one of the at least one open frame sides; wherein the at least one lens system extends through the adaptor orifice and the wedge orifice; and wherein each of the kinematic adaptor contact points are joined to each of the opposing kinematic wedge contact points to form a kinematic connection between the wedge and the adaptor.

The present invention also broadly comprises a photographic imaging system comprising: a photographic imaging system comprising at least one global positioning sensor; at least one camera, each of the at least one cameras including a camera frame having at least one open side and defining at least two opposing camera frame orifices; an image receiving means releasably attached to the camera frame and positioned at least partly over the first of the two opposing camera frame orifices; an adaptor defining an adaptor orifice positioned around the second of the two opposing camera frame orifices and having three kinematic adaptor contact points, each of the at least three adaptor contact points having a different shape; at least one lens system, each of the at least one lens system having at least one lens, wherein each of the at least one lens system includes an attachment end having at least three attachment points for releasable attachment to the camera frame and positioned to at least partly cover the second opposing camera frame orifice; at least one wedge, each of the at least one wedge defining a wedge orifice and including three kinematic wedge contact points, each of the three kinematic wedge contact points having a shape complementary to an opposing kinematic adaptor contact point; and, a removable shutter cassette including a camera shutter and a light seal, wherein the removable shutter cassette is received by one of the at least one opposing open frame side; wherein the at least one lens system extends through the adaptor orifice and the wedge orifice; and, wherein each of the kinematic adaptor contact points are joined to each of the opposing kinematic wedge contact points to form a kinematic connection between the wedge and the adaptor; and, a microcontroller operationally connected to the at least one global positioning sensor and the at least one camera.

One object of the invention is to present a camera and photographic image system with a kinematic connection to resist changes in alignment and calibration caused by warping, contraction, expansion and twisting of the camera components.

A second object of the invention is to provide a camera constructed and assembled to maintain calibration and alignment during removal and replacement of a camera shutter.

A third object of the invention is to supply a camera having an athermal construction to allow calibration and alignment to be maintained during temperature change.

An additional object of the invention is make available a camera in which a variety of different lens systems may be interchanged for use without the necessity of recalibration or realignment of the components of the camera.

A further object of the invention is to provide a photographic imaging system configured to reduce downtime caused by component repair or replacement.

A still further object of the invention is provide a photographic imaging system constituted to enable relatively rapid replacement of lens systems and shutter systems during operation of the system.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which:

FIG. 5A is a front view of the shutter cassette;

FIG. 5B is a bottom view of the shutter cassette looking into the cassette cover;

FIG. 5C is a side view of the shutter cassette with the cover removed showing the shutter motor;

DETAILED DESCRIPTION OF PREFERRED EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
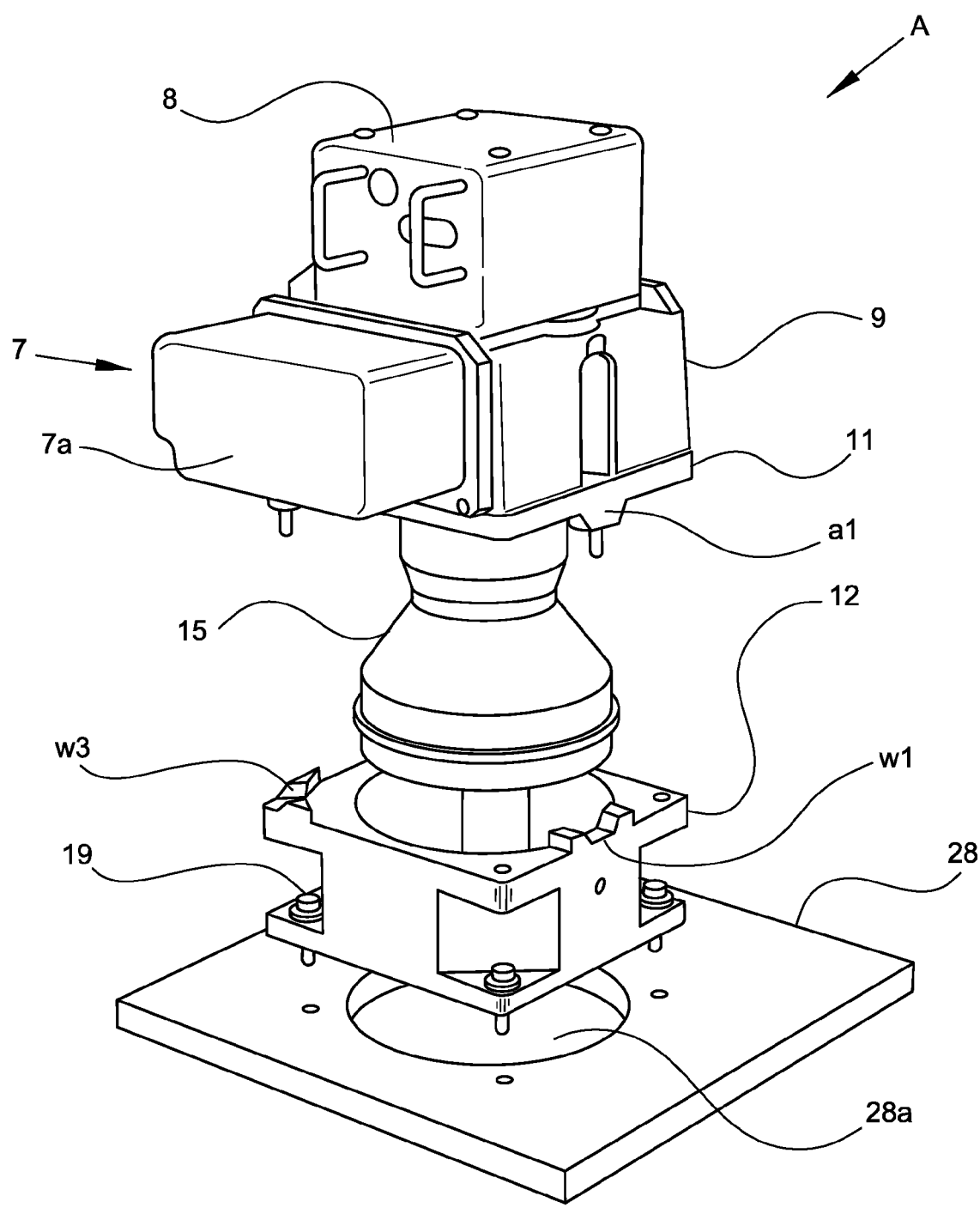
FIG. 1A is a partially exploded side perspective view of the camera system of the present invention.
Figure 1B:
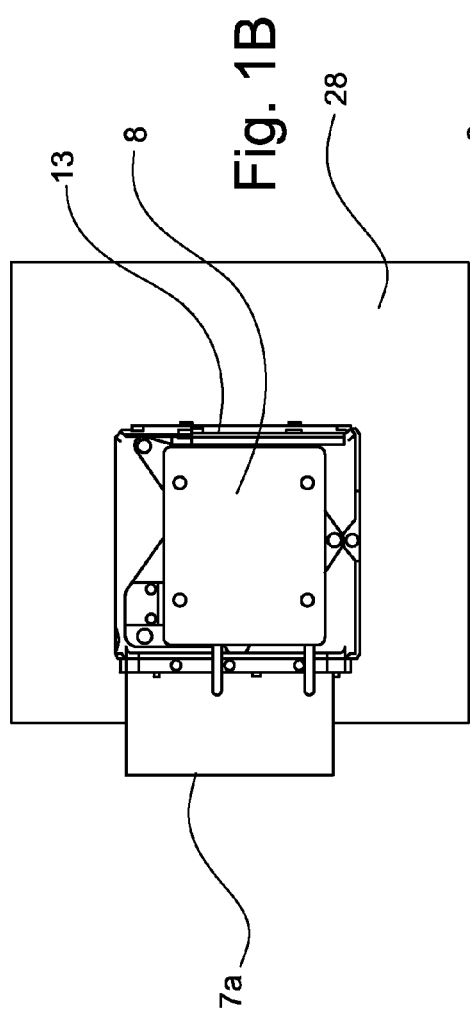
FIG. 1B is a top view of the camera system of the present invention attached to a baseplate.

Adverting to the drawings, FIG. 1A is a partially exploded side perspective view of camera system A ("camera A") of the present invention. The shutter cassette 7 ("shutter 7") of camera A is seen extending from the body of camera A. Camera frame 9 ("frame 9") is positioned between image receiving means 8 and interface adapter 11 ("adaptor 11") and acts as a shutter cassette receiver. As seen in more detail in FIG. 2, lens system 15 ("lens 15") has at least one lens and is attached to frame 9 through adaptor 11 using a three point attachment configuration at attachment end 15b of lens 15 (not seen in FIG. 1) so as to easily remove and/or change lens 15 without recalibrating or realigning camera A. In the embodiment shown, lens 15 is a 60 mm lens system, but it will be recognized by persons having skill in the art that other lens 15 having a substantially identical three point configuration at attachment end 15b can also be used in camera A. Wedge 12 defines an orifice through which lens 15 extends when camera A is assembled. Wedge 12 is attached to adaptor 11 through a kinematic three contact point system described below. Assembled camera A is fastened to baseplate 28. Typically, baseplate 28 is itself attached to a fixed airborne rack system or other assembly known in the art that allows camera A to be used in aerial photography, often with similar or different cameras. Alternatively, baseplate 28 may be attached directly to the airframe. Baseplate 28 also defines an orifice 28a through which lens 15 extends. FIG. 1B is a top view of camera A attached to baseplate 28.

Figure 1D:
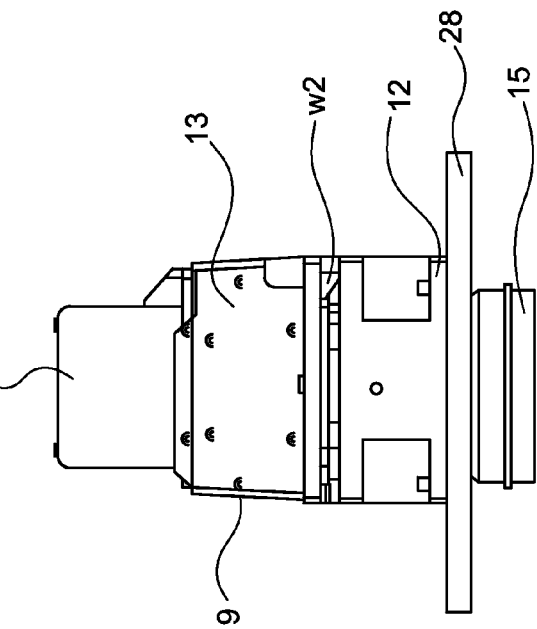
FIG. 1D is a different side view of the assembled camera system depicting the camera frame cover and a second kinematic adaptor-wedge contact point.
Figure 1C:
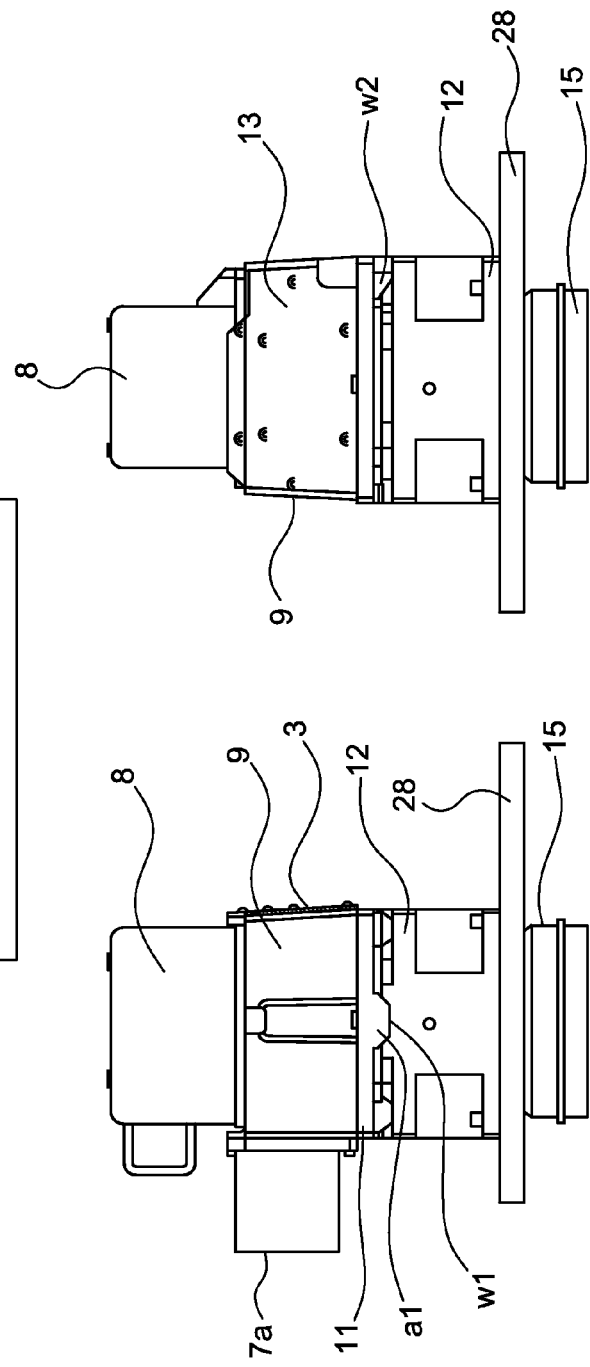
FIG. 1C is a side view one of the kinematic adaptor-wedge contact points of the assembled camera system fastened to the baseplate with the camera lens extending through the baseplate.

FIG. 1C is a side view of assembled camera A fastened to baseplate 28 with lens 15 extending through baseplate 28. Seal 3 is a light-tight seal preventing light from entering through the shutter 7. Also seen is kinematic adaptor contact point a1 on adaptor 11 in a releasable contact with kinematic contact point w1 of wedge 12 to form part of the three point kinematic connection. The kinematic connection acts to maintain proper alignment of the components of camera A by countering torsion, warping, or other forces on camera A. FIG. 1D is a view of a different side of assembled camera A showing camera frame cover 13 and kinematic contact w2 of wedge 12.

Figure 2:
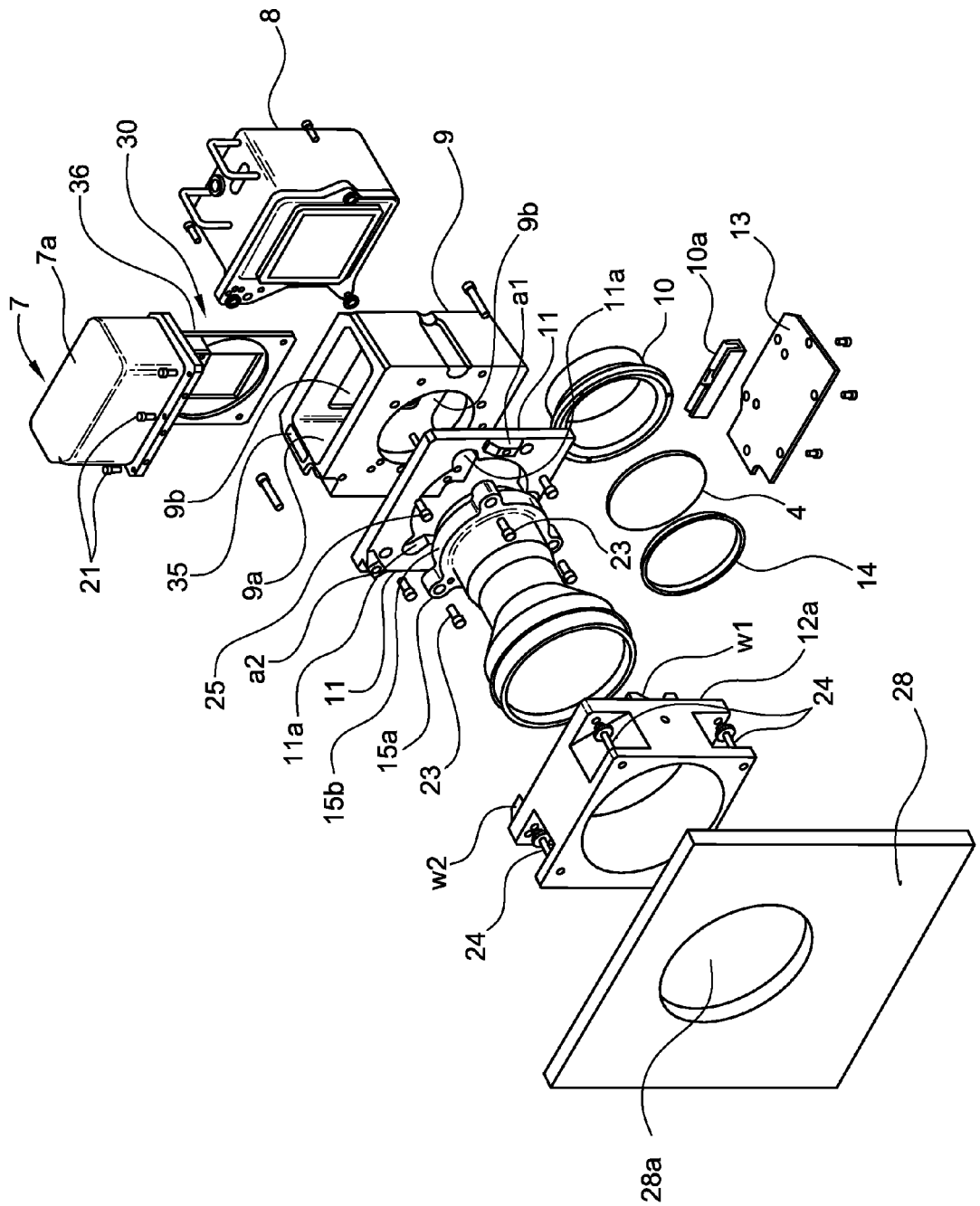
FIG. 2 is an exploded top perspective view of the camera system of the present invention.

FIG. 2 is an exploded top perspective view of camera A. FIG. 2 depicts the insertion of shutter cassette 7 into one of two opposing open sides 9a of frame 9. Frame 9 also includes opposing frame orifices 9b. This alignment configuration allows cassette 7 to be removed from camera A and replaced without the need for realigning the whole camera assembly. Preferably guided by pin 25, lens 15 includes three lens ears 15a that fit through adapter cutouts 11a of adapter 11 to frame 9. Screws 23 fasten lens 15 to frame 9 through holes defined by lens ears 15a and into holes defined by frame 9 so as to at least partly cover frame orifice 9b. Shutter 7 is inserted into frame 9 and fastened thereto with screws 21. Adapter 11 is then attached to camera frame 9, preferably using screws. It is clear from FIG. 2 that shutter 7 can be removed from and attached to frame 9 without causing any misalignment of lens 15 or the other components of camera A.

A kinematic connection may be defined as the joining of two fixtures such that the joined contact points are designed or configured exactly to kinematically constrain the part in question. Each kinematic contact point has two individual contact subpoints for a total of six contact subpoints, enough to constrain all six of the part's degrees of freedom. Degrees of freedom (DOF) are the set of independent displacements and/or rotations that specify completely the displaced or deformed position and orientation of the body or system. In one example, the kinematic connection may comprise three hemispheres on one part that fit respectively into a tetrahedral dent, a v groove, and a flat. Another example of a kinematic coupling not seen here consists of three radial v-grooves in one part that each mate with three hemispheres in another. Both kinematic connections and the concept of degrees of freedom are well known to those having skill in the art.

In one embodiment, the kinematic system, a single adaptor 11 may be fabricated with kinematic contact points a1, a2, and a3 to form a kinematic connection with a plurality of wedges 12 each with kinematic contact points w1, w2, and w3 in which each wedge 12 varies in thickness. In this embodiment, diverse lenses 15, each having an attachment end 15b with substantially the same ears 15a, may be passed through the same adaptor cutouts 11a to attach to the same holes in frame 9. The matching ears 15a on each different lens 15 provide the advantage of utilizing different lenses 15 to be used while eliminating the need for recalibration or realignment whenever one lens 15 is removed and a different lens 15 is attached to the same frame 9 through the same cutouts 11a of the same adaptor 11.

Figure 3:
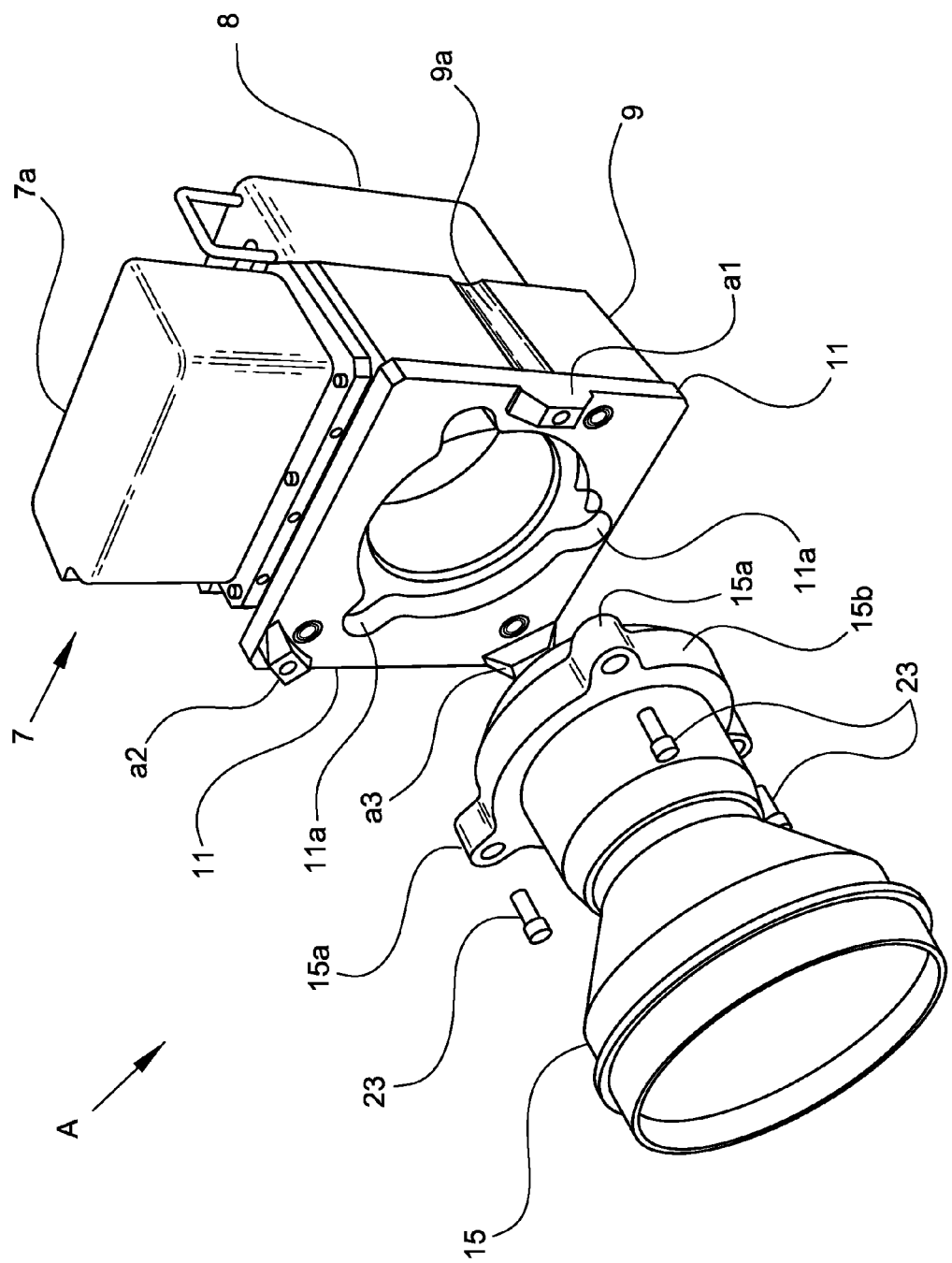
FIG. 3 is an enlarged top perspective view of the camera system of the present invention showing the attachment of the camera lens to the camera frame to enable alignment with the camera lens system with the several components of the system.
Figure 4:
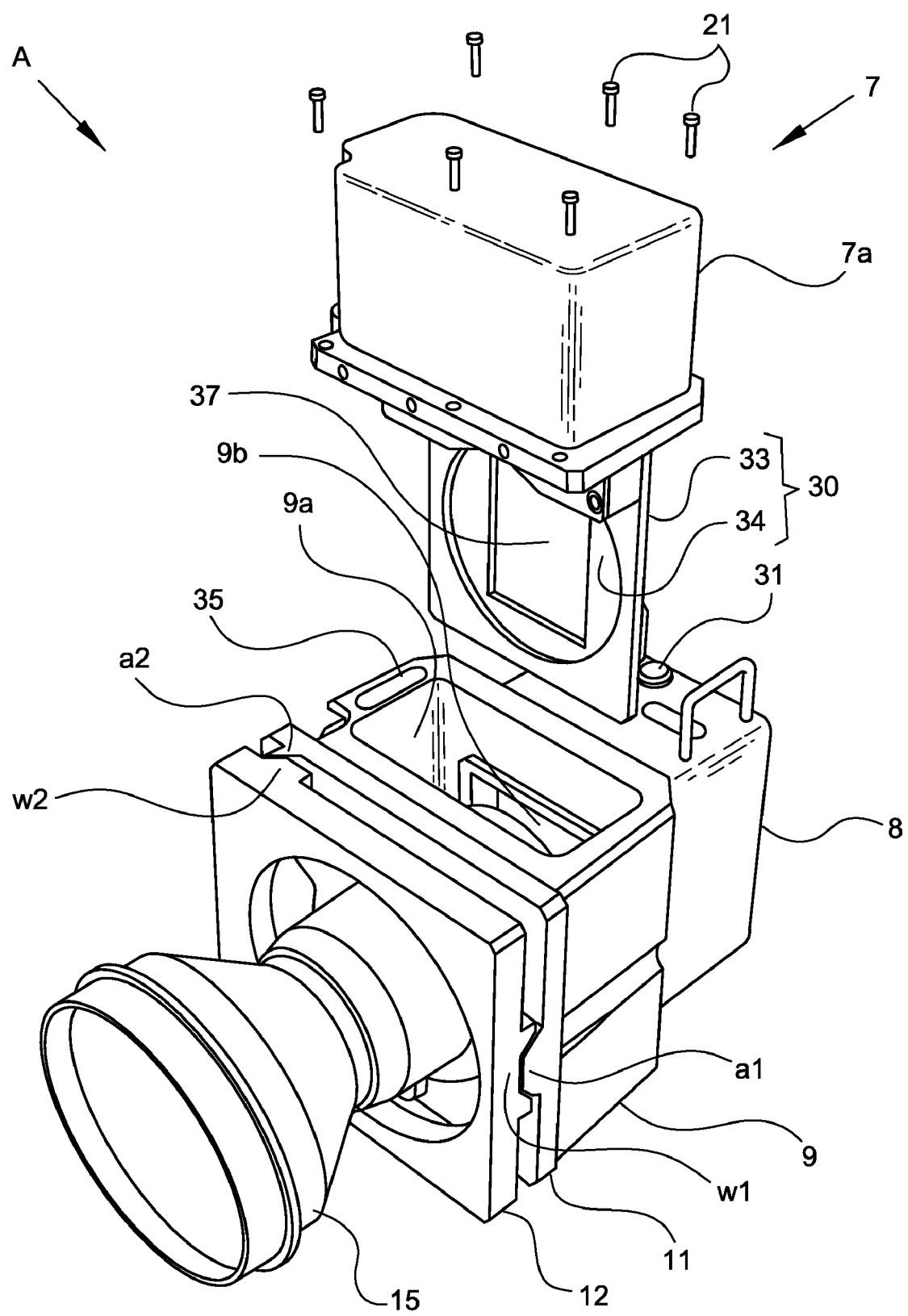
FIG. 4 is a top perspective view of the camera system showing the removal and replacement of the shutter cassette from the camera frame and the kinematic connection between the wedge and the adaptor attached to the camera frame.

For example, it will be seen that lens 15 in FIG. 3 is shorter than lens 15 depicted in FIG. 2. Also seen is that wedge 12 in FIG. 4 is narrower than as shown in FIG. 2. Thus, a single camera system A may be adapted to a plurality of different length lenses 15 by combining each lens 15 with a suitable wedge 12. It will be recognized by those having skill in the art that a similar system may be utilized using a wedge 12 and a plurality of different adaptors 11 having different widths.

Alternatively, each wedge 12-adaptor 11 pair may be fabricated as a unique combination such that each pair member only forms a kinematic connection when used with the other member. In one embodiment, each wedge 12 and adaptor 11 may be given a serial number or other identifying mark to ensure the members of each unique pair are joined together.

In the best mode, a unique or custom kinematic connection between wedge 12 and adaptor 11 may be made by "torque-fitting" wedge 12 contact points w1, w2, and w3 with corresponding adaptor 11 contact points a1, a2, and a3. Preferably, the contact points a1, a2, and a3, are fabricated with a stainless steel, such as 416 stainless steel. More preferably, the entire adaptor 11 is fabricated from stainless steel, as is camera frame 9, while wedge contact points w1, w2, and w3, if not the whole of wedge 12 is produced from aluminum, such as 6061-T6 aluminum, which is softer than stainless steel. Although either adaptor 11 or wedge 12 may be made from the harder material, it is preferable to have adaptor 11 made from the same material as camera frame 9. Stainless steel bolts are used to attach wedge 12 and adaptor 11 using a torque wrench or other suitable tool to measure the torque placed on the screws. The screws are torqued to a range of 45-75 in./lbs. At 45 in./lbs. the aluminum contact points on wedge 12 begin to permanently deform under the pressure of the bolts. Above 75 in./lbs. the stainless bolts will begin to strip. Preferably, the torque pressure is about 55 in./lbs. While wedge 12 and adaptor 11 are still attached after this deforming process, the backface contacting camera frame 9 is finished to create a face parallel to the back face (facing baseplate 28) of wedge 12.

Using this torquing method, a custom fit is created between wedge 12 and adaptor 11 as the wedge contact points are each uniquely deformed by the torquing pressure to fit with the harder corresponding stainless steel adaptor contact points. This creates a custom kinematic connection between the specifically paired wedge 12 and adaptor 11. Further, wedge 12 may be again deformed by bringing the torque pressure to 60 in./lbs. for a different adaptor 11 to create a new custom kinematic connection.

Alignment and orientation may be maintained by fabricating each wedge 12 to include kinematic contact points w1, w2, and w3 on the wedge face that faces opposing kinematic adaptor contact points a1, a2, and a3, respectively, on adaptor 11. Kinematic contact points w1, w2, and w3 are constituted in shape and size to contact kinematic contact points a1, a2, and a3 to form a kinematic connection such that when the contact points of wedge 12 and adaptor 11 are joined, wedge 12 and adaptor 11 and their respective attached camera A components are thereby consistently placed and remain in the same alignment and orientation by way of the kinematic connection. By alignment is meant that the components of camera A are aligned so that the center of each component when added to camera A is aligned along the center axis of camera system A. By orientation is meant that the same contact points are attached to each other after the removal and reattachment of wedge 12 and adaptor 11 so that the same analogous sides of the various adaptor 11 and wedge 12 are oriented on the same side or face of camera A.

As with adaptor 11, the wedge contact points each have a different shape complementary to each opposing adaptor contact point. By complementary is meant that when the sets of opposing contact points, e.g. a1 and w1 are joined together they will form a kinematic connection to restrain movement of wedge 12 and adaptor 11 and their attached components through the six degrees of freedom caused by environmental factors such as temperature changes, or other causes. For example, as seen in FIG. 1C and FIG. 4 kinematic contact point a1 on adaptor 11 is releasably joined with complementarily shaped kinematic contact point w1 on wedge 12. Similarly, in FIG. 1D, contact points a2 and w2 are complementarily shaped as part of the three point kinematic connection of wedge 12 and adaptor 11. In one embodiment, a plurality of wedges 12 will all have contact points w1, w2, and w3 with the same size and shape enabling each different wedge 12 to form an even, aligned attachment to the same adaptor 11. Therefore, while different wedges 12 may have different widths to accommodate lenses 15 having different lengths or circumferences, the three point union of any of the plurality of wedges 12 with the same adaptor 11 enables the different lenses 15 to be attached and detached from camera A without the need for recalibrating and/or realigning camera A. By width is meant the distance between the two opposing faces of wedge 12 that contact attached components of camera A.

In addition, this consistent alignment extends to the aligned attachment of camera A to any rack or other supporting system for camera A using lenses 15 that have different lengths or circumferences and wedges 12 having different widths that attach to baseplate 28. Screws 24 are used to mount wedge 12 to baseplate 28. Screws 19 fit into side slot 9a on frame 9 and pass through holes in contact a1 and into holes (not seen) in wedge contact point w1. Contact a2-w2 and a3-w3 are similarly joined together.

Aligned camera A is then aligned with the system by attaching camera A to baseplate 28 as described above. Image receiving means 8 is releasably attached to frame 9 in a similar fashion to at least partly cover one camera frame orifice 9b. Image receiving means 8 receives and processes the image data that passes through lens 15 and aperture 37 in shutter 30 as in any camera known in the art. Image receiving means 8 may be camera film or a sensor that receives light from the image and converts it into digitized image data which can be stored and processed at a later time. Such sensors are well known in the art. Image receiving means 8 includes input/output interface 31 (not seen in FIG. 2) connected to a computer or other control device, including but not limited to a human user, to control the operation of camera A. Frame 9 and/or cassette 7 possess interface(s) 35 to enable control signals to pass through to control operation of shutter 30. Retaining ring 14, glass plate 4 and lens baffle 10 all fit into frame 9 to hold lens 15 in alignment with image receiving means 8 and aperture 37 of shutter 30. They may have different sizes and shapes for different lenses as will be recognized by those having skill in the art.

FIG. 3 is an enlarged top perspective view of camera A showing the attachment of lens 15 to frame 9 to enable its alignment with camera A. Lens ears 15a fit through cutouts 11a on adaptor 11 and are held in place by screws 23 passing into alignment holes on frame 9 (not seen in FIG. 3). Because of the preferably close fit of ears 15a into cutouts 11a alignment of the lens with camera A is more easily maintained.

FIG. 4 is a top perspective view of camera A showing the removal and replacement of shutter cassette 7 from camera A. Shutter 30 is inserted into the space defined by frame 9 and fastened by screws 21. Also seen are input/output connections 31 and 35 on image receiving means 8 and frame 9, respectively, which act to control the shutter mechanism. It can be seen that camera A remains intact and aligned when shutter cassette 7 is removed as the structural integrity of camera A does not depend on any of the components of shutter cassette 7. A light tight seal (not seen in FIG. 4), such as an o-ring, at the camera-cassette interface prevents stray light from entering the camera.

Figure 5:
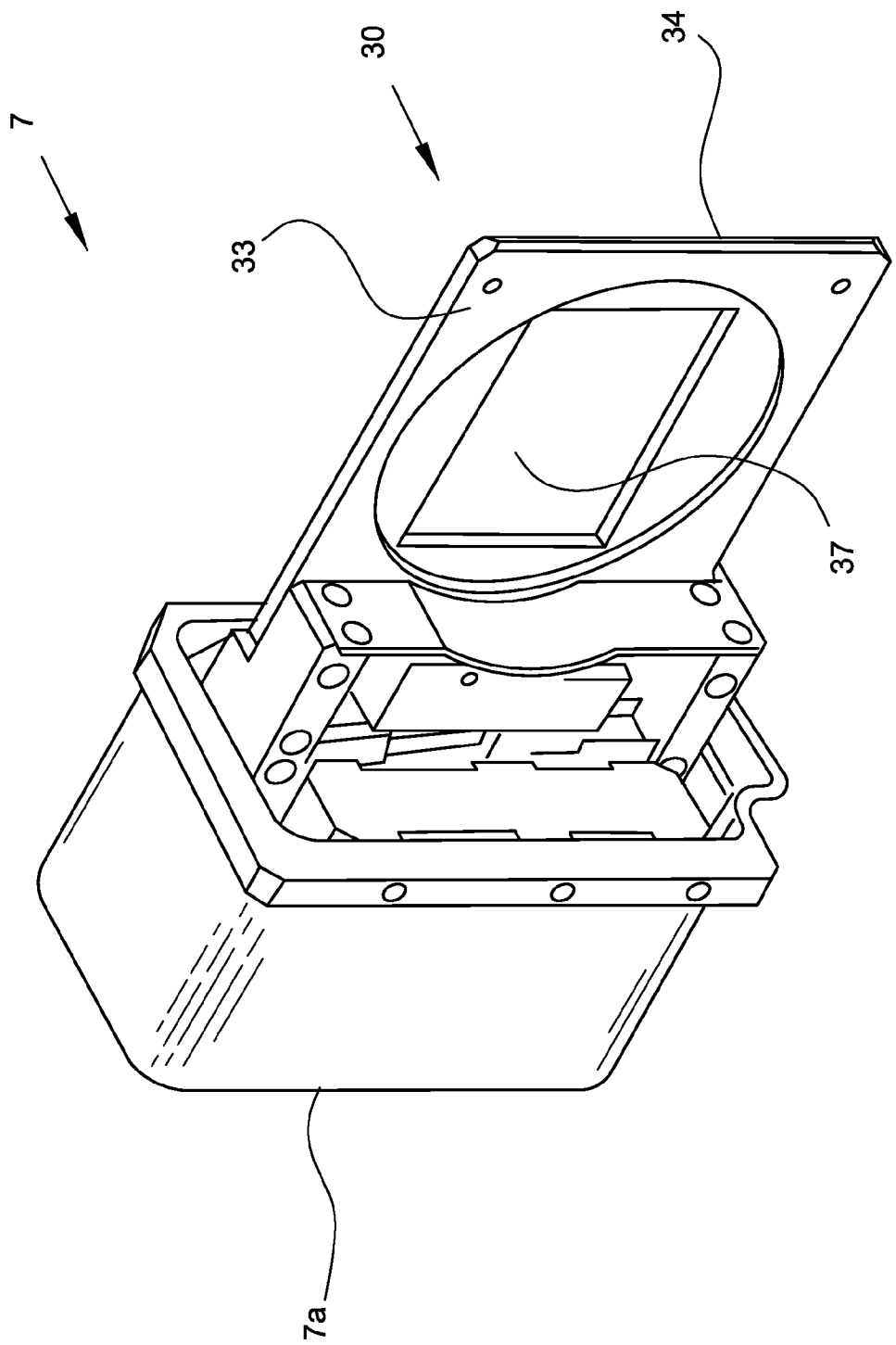
FIG. 5 is a side perspective view of the shutter cassette removed from the camera system.

FIG. 5 is a side perspective view of shutter cassette 7 removed from camera A. Shutter complex 30 is a curtain or focal plane shutter that is positioned immediately in front of the focal plane of the camera, that is, directly in front of image receiving means 8. One of the main advantages of focal-plane shutters is that the shutter can be built into the body of a camera which accepts different individual lenses 15, eliminating the need for each lens to have an individual central shutter built into it. The focal-plane shutter is also a fairly simple mechanism which is capable of fast and accurate shutter speeds. FIG. 5A is a front view of shutter cassette 7.

FIG. 5B is a bottom view of shutter cassette 7 looking into cover 7a. The two shutter components 33 and 34 of shutter 30 are seen as are input/output connection 35 and light seal 36. FIG. 5C is a side view of shutter cassette 7 with cover 7a removed showing shutter motor 40. Suitable shutter motors 40 are well known to those having skill in the art.

Opaque shutter curtains 33 and 34 travel across the film plane. For slower shutter speeds, the first curtain moves across the film plane and after the required time with the shutter open, the second curtain closes aperture 37 moving in the same direction. When the shutter is cocked again, shutter curtains 33 and 34 are moved back to their starting positions, ready to be released. Faster shutter speeds are achieved by the second curtain closing before the first one has fully opened. This results in aperture 37 having the form of a vertical slit that travels horizontally across the film. Faster shutter speeds simply require a narrower slit, as the speed of travel of the shutter curtains is not normally varied. Using this technique, cameras A are capable of shutter speeds of up to $\frac{1}{2000}$ or $\frac{1}{4000}$. Persons of skill in the art will recognize that other types of focal plane shutters may be used such as, but not limited to, solid state liquid crystal shutters, iris shutters, and shutters utilizing rotating mirrors.

The embodiment of shutter 30 shown in the instant application utilizes vertical travel shutters. These work in precisely the same way as horizontal shutters, but because of the typically shorter distance the shutter blades must travel and the faster shutter movement enabled by the preferred metal construction, the shutter blades can travel across the film plane in less time. Shutter 30 can reliably provide higher speeds (up to $\frac{1}{8000}$ of a second). It will be recognized that camera A can utilize either horizontal- or vertical-travel curtain shutters.

The camera design allows field maintenance of the camera system while maintaining both Interior Orientation and Exterior Orientation. It also enables the maintenance of the structural and environmental integrity of the camera system.

Maintenance activities can typically involve (a) removing the camera from its hard-mount to the airframe, (b) changing or servicing the lens, and (c) changing or servicing the shutter.

Exterior Orientation (EO) is the alignment of the cameras principal axis (pointing) over 3-angular and 3-positional (6 degrees of freedom) with respect to a fixed datum or image point.

The design preserves EO using (a) rigid mechanical structures comprising the camera body (frame 9), lens mount baseplate 28, wedge 12, adapter 11, and an image receiving means 8, such as a digital image sensor, (b) a precision, pinned mount assembly for the lens, which relocates a lens to a high positional and angular accuracy, and (c) a kinematic 3-point mount between the camera system, in this case wedge 12 and a mounting/reference plate, in this case adaptor 11, to enable remounting of the camera with high positional and angular accuracy and maintaining of the original accurate mounting position.

Interior Orientation (IO) is a property of the camera system that describes the point-to-point transfer of image data from an emissive or reflective point in the subject scene being photographed or observed, to a point in the image recorded or captured in image receiving means 8. It includes physical effects such as lens magnification, lens distortion, and sensor non-idealities (flatness, pixel areal response). The IO of a system is typically measured using a rigorous lab calibration process(es) known in the art, and is mathematically represented as a multidimensional polynomial or similar expression.

The disclosed design preserves IO using (a) a vibration-resistant, athermal design of the lens body 15, (b) lens 15-to-camera frame 9 coupling, and (c) a removable shutter cassette 7 to allow field replacement of the shutter 30. The preferred athermal design is created by using materials to construct the camera that have offsetting coefficients of expansion to create the athermal design by creating offsetting reactions to temperature changes. Therefore, when the temperature changes, the IO of the system is not changed by the expansion or contraction of the different components in camera A. Such athermal materials are well known to those having skill in the art.

The cassette can be removed/installed without compromising the hermetic and light-tight seal of the camera system A. This is accomplished using an O-ring (or gasket) seal 36 on the cassette 7-camera frame 9 interface.

Cassette 7 can be removed/installed without compromising the interior orientation parameters of the camera system. This is accomplished by (a) placing focal plane shutter 30 very close to image receiving means 8 that is, at/near the lens conjugate plane thus minimizing any aperture effect on the lens transfer function and (b) constructing the camera body so that it does not depend on shutter 30 or the shutter mount (cassette 7) for any of it's mechanical rigidity or athermal properties. Typical image receiving means 8 include photographic film or image sensors or image sensor systems known in the art that allow for the digitization and storage of image data.

Other elements of the cassette 7 design allow shutter 30 to be replaced without removing camera A from the hard mount to the airframe. As can be seen in FIGS. 2 and 4, cassette 7 can be removed from frame 9 without affecting the attachment of the other components of camera A to each other or baseplate 28. This preserves EO even in the absence of a kinematic mount design. These properties allow for replacement of shutter cassette 7 in the field during an operation. Because EO and IO are maintained without depending on the shutter as a permanent component, shutter cassette 7 can be removed without the need for subsequent realignment or recalibration.

Figure 6:
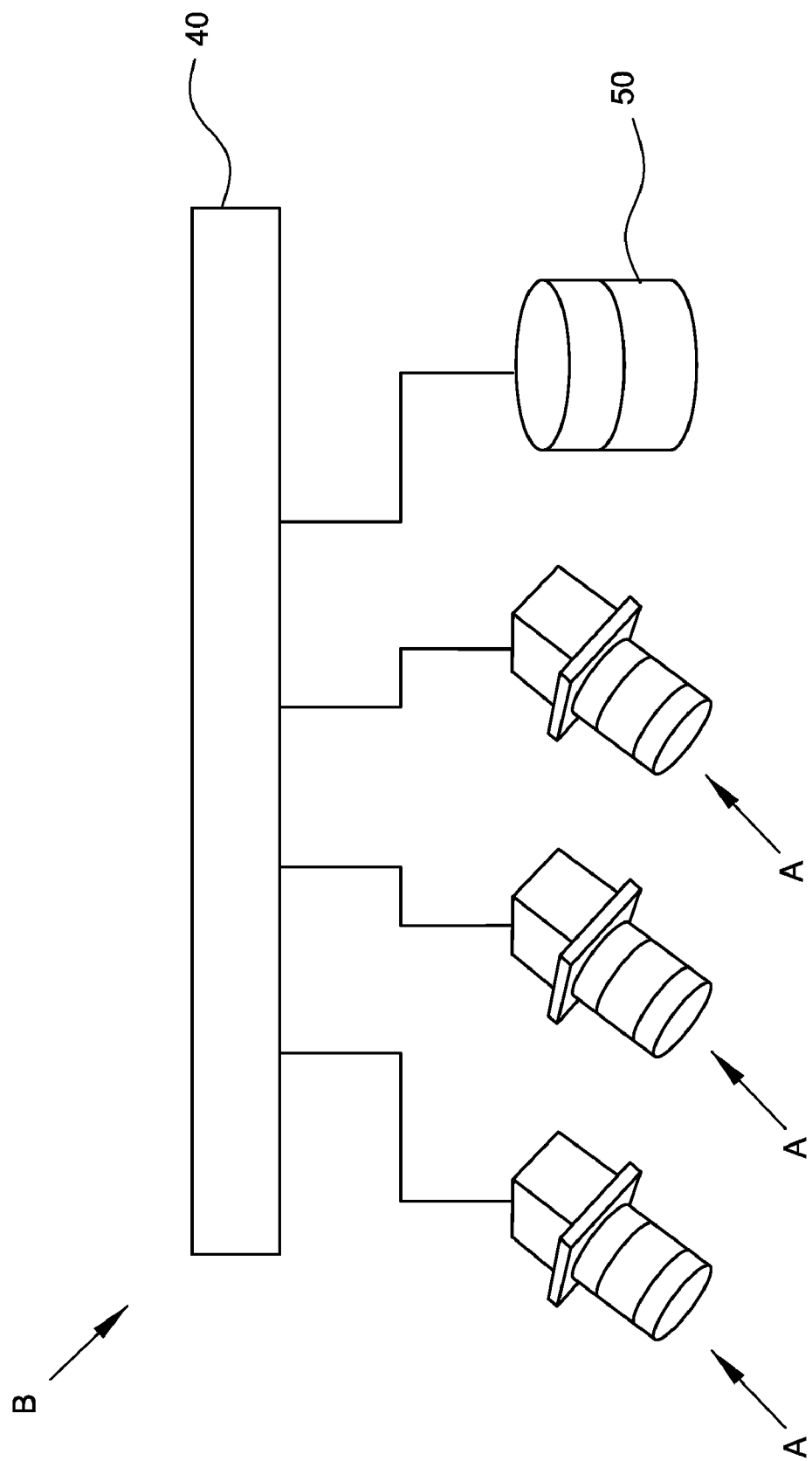
FIG. 6 is a schematic view of a photographic imaging system.
Figure 7:
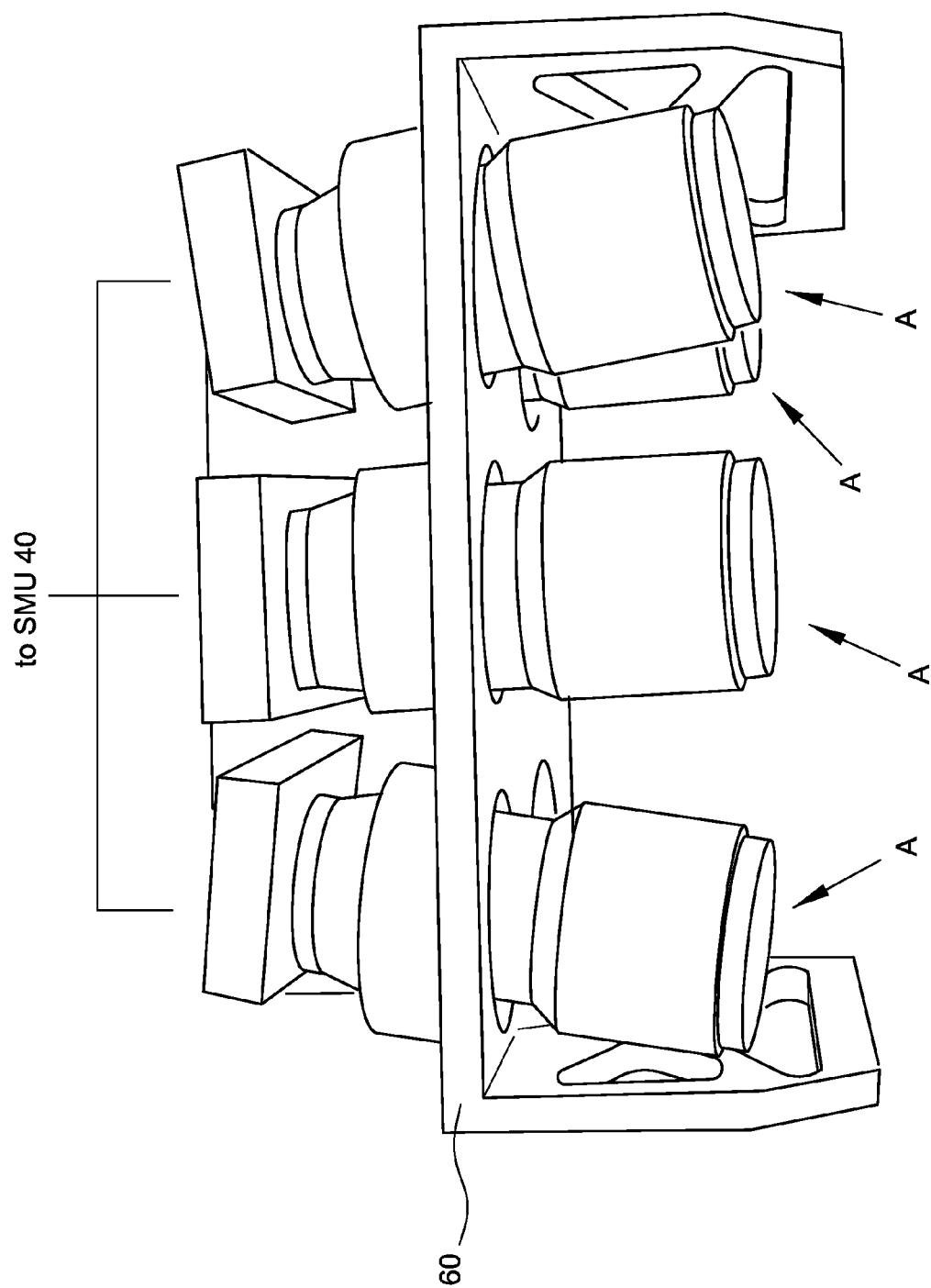
FIG. 7 depicts an array of cameras for the photographic imaging system arranged on a rack and aligned at different angles.

FIG. 6 is a schematic view of a photographic imaging system B, such as an airborne mapping or reconnaissance system, which includes at least one and preferably an array of cameras A in operative connection with a microcontroller or sensor management unit (smu) 40. By operatively connected is meant that a component or device is connected either directly or indirectly to a second component and causes that second component to function. Also seen is a global positioning sensor (GPS) and/or spatial sensor(s) 50 rigidly connected to either the cameras or a common rack holding the camera(s) to preclude motion between and also linked to smu 40. The spatial sensor may be an Inertial Measurement Unit (IMU) the measures position and angular orientation. FIG. 7 depicts an array of cameras A arranged on a rack 60 and aligned at different angles to obtain images of a wide range of area or terrain. It will be understood that the rack is attached to an airborne vessel such as an airplane, balloon, etc. in such a manner that the orientation of the arrayed cameras is fixed into place for a particular operation although the orientation of one or more cameras can be changed for a different operation or a different phase of a particular operation. Smu 40, through its software or the intervention of a human user, directs the operation of the cameras A and can receive and store the images collected by the cameras A through image receiving means 8.

Although not seen in FIG. 6 or 7, it is readily recognized that cameras A equipped with shutter cassette 7 enable a more efficient operation as they will allow for quick replacement of a faulty shutter in one camera A while the others can continue to operate. This replacement can take place on board an airborne vehicle or other mobile system carrier. Additional advantages exist in that multiple shutter cassettes 7 can be made available in the event of multiple shutter failures and that only replaceable cassettes 7 need be sent offsite for repair, not entire cameras or camera systems.

Thus it is seen that the objects of the invention are efficiently obtained, although changes and modifications to the invention should be readily apparent to those having ordinary skill in the art, which changes would not depart from the spirit and scope of the invention as claimed.

We claim:

1. A camera system having a removable shutter, said camera system comprising:
   a camera frame having at least one open sides and defining at least two opposing camera frame orifices;
   an image receiving means releasably attached to said camera frame and positioned at least partly over the first of said two opposing camera frame orifices;
   an adaptor defining an adaptor orifice positioned around said second of said two opposing camera frame orifices and having three kinematic adaptor contact points, each of said at least three adaptor contact points having a different shape;
   at least one lens system, each of said at least one lens system having at least one lens, wherein each of said at least one lens system includes an attachment end having at least three attachment points for releasable attachment to said camera frame and positioned to at least partly cover said second opposing camera frame orifice;
   at least one wedge, each of said at least one wedge defining a wedge orifice and including three kinematic wedge contact points, each of said three kinematic wedge contact points having a shape complementary to an opposing kinematic adaptor contact point; and,
   a removable shutter cassette including a camera shutter and a light seal, wherein said removable shutter cassette is received by one of said at least one opposing open frame sides;
   wherein said at least one lens system extends through said adaptor orifice and said wedge orifice; and,
   wherein each of said kinematic adaptor contact points are joined to each of said opposing kinematic wedge contact points to form a kinematic connection between said wedge and said adaptor.

2. The camera system as recited in claim 1 wherein said wedge kinematic contact points and said adaptor contact points are fabricated from materials having different hardness.

3. The camera system as recited in claim 2 wherein torque pressure is applied to said kinematic wedge contact points when joined to said opposing adaptor kinematic contact points to deform said wedge contact points to fit with said opposing adaptor contact points.

4. The camera system as recited in claim 3 wherein said applied torque pressure ranges between about 45 in./lbs. and about 75 in./lbs.

5. The camera system as recited in claim 4 wherein said applied torque pressure is about 55 in./lbs.

6. The camera system as recited in claim 4 wherein said applied torque pressure is about 60 in./lbs.

7. The camera system as recited in claim 1 further comprising a baseplate wherein said at least one wedge is removably attached to said baseplate.

8. The camera system as recited in claim 1 further comprising a signal interface between said image receiving means and said shutter cassette to distribute signals to and from said shutter cassette.

9. The camera system as recited in claim 1 wherein said image receiving means includes at least one signal input/output connector to enable said signal interface to receive control signals.

10. The camera system as recited in claim 1 wherein said image receiving means is photographic film.

11. The camera system as recited in claim 1 wherein said image receiving means is an image processor.

12. The camera system as recited in claim 1 wherein said removable lens system attachment is a three point attachment wherein each of said three point attachments includes a projecting lens ear on said lens system fit through a cutout on said adapter.

13. The camera system as recited in claim 1 wherein said camera system is athermal.

14. A photographic imaging system comprising:
at least one global positioning sensor and/or spatial sensor;
at least one camera, each of said at least one camera comprising:
   a camera frame having at least one open sides and defining at least two opposing camera frame orifices;
   an image receiving means releasably attached to said camera frame and positioned at least partly over the first of said two opposing camera frame orifices;
   an adaptor defining an adaptor orifice positioned around said second of said two opposing camera frame orifices and having three kinematic adaptor contact points, each of said at least three adaptor contact points having a different shape;
   at least one lens system, each of said at least one lens system having at least one lens, wherein each of said at least one lens system includes an attachment end having at least three attachment points for releasable attachment to said camera frame and positioned to at least partly cover said second opposing camera frame orifice;
   at least one wedge, each of said at least one wedge defining a wedge orifice and including three kinematic wedge contact points, each of said three kinematic wedge contact points having a shape complementary to an opposing kinematic adaptor contact point; and,
   a removable shutter cassette including a camera shutter and a light seal, wherein said removable shutter cassette is received by one of said at least one opposing open frame sides;
   wherein said at least one lens system extends through said adaptor orifice and said wedge orifice;
   wherein each of said kinematic adaptor contact points are joined to each of said opposing kinematic wedge contact points to form a kinematic connection between said wedge and said adaptor; and,
   a microcontroller operationally connected to said at least one global positioning sensor and/or spatial sensor and said at least one camera.

15. The photographic image system as recited in claim 14 wherein said wedge kinematic contact points and said adaptor contact points are fabricated from materials having different hardness.

16. The photographic image system as recited in claim 15 wherein torque pressure is applied to said kinematic wedge contact points when joined to said opposing adaptor kinematic contact points to deform said wedge contact points to fit with said opposing adaptor contact points.

17. The photographic image system as recited in claim 16 wherein said applied torque pressure ranges between about 45 in./lbs. and about 75 in./lbs.

18. The photographic image system as recited in claim 17 wherein said applied torque pressure is about 55 in./lbs.

19. The photographic image system as recited in claim 17 wherein said applied torque pressure is about 60 in./lbs.

20. The photographic imaging system as recited in claim 14 further comprising a baseplate wherein said at least one wedge is removably attached to said baseplate.

21. The photographic imaging system as recited in claim 14 further comprising a signal interface between said image receiving means and said shutter cassette to distribute signals to and from said shutter cassette.

22. The photographic imaging system as recited in claim 21 wherein said image receiving means includes at least one signal input/output connector to enable said signal interface to receive control signals.

23. The photographic imaging system as recited in claim 14 wherein said image receiving means is photographic film.

24. The photographic imaging system as recited in claim 14 wherein said image receiving means is an image processor.

25. The photographic imaging system as recited in claim 14 wherein said removable lens system attachment is a three point attachment wherein each of said three point attachments includes a projecting lens ear on said lens system fit through a cutout on said adapter.

26. The photographic imaging system as recited in claim 14 wherein said at least one camera is a plurality of cameras.

27. The photographic imaging system as recited in claim 14 wherein said at least one global positions sensor is a plurality of global positioning sensors.

28. The photographic imaging system as recited in claim 14 wherein said at least one wedge is a plurality of wedges.

29. The photographic imaging system as recited in claim 28 wherein at least two of said plurality of wedges have different widths.

30. The photographic system as recited in claim 14 wherein said photographic system is athermal.

* * * * *